(12) United States Patent
Grob et al.

(10) Patent No.: US 6,536,851 B2
(45) Date of Patent: Mar. 25, 2003

(54) DEBRIS STRIPPING APPARATUS

(75) Inventors: Robert J. Grob, Peoria, IL (US);
Bradley R. Jones, Dekalb, IL (US);
Sean C. McGinnis, Sycamore, IL (US);
Paul J. Mobley, Sycamore, IL (US)

(73) Assignee: Caterpillar Inc, Peoria, IL (US)

( * ) Notice: Subject to any disclaimer, the term of this patent is extended or adjusted under 35 U.S.C. 154(b) by 33 days.

(21) Appl. No.: 09/850,944

(22) Filed: May 8, 2001

(65) Prior Publication Data

US 2002/0167222 A1 Nov. 14, 2002

(51) Int. Cl.[7] ............... B60S 1/62; B62D 25/16; F16H 57/00
(52) U.S. Cl. ........... 305/115; 305/110; 305/100; 305/199
(58) Field of Search .............. 305/100, 107, 305/110, 111, 115, 108, 184, 199; 172/610; 404/129

(56) References Cited

U.S. PATENT DOCUMENTS

| 301,743 | A | | 7/1884 | Michael et al. |
|---|---|---|---|---|
| 4,269,457 | A | | 5/1981 | Farrior |
| 4,818,040 | A | | 4/1989 | Mezzancella et al. |
| 4,825,969 | A | | 5/1989 | King et al. |
| 4,830,439 | A | | 5/1989 | Collins et al. |
| 5,190,363 | A | * | 3/1993 | Brittain et al. ............. 305/137 |
| 5,226,703 | A | | 7/1993 | Norman |
| 5,303,992 | A | * | 4/1994 | Grainger ................. 305/110 |
| 5,758,932 | A | | 6/1998 | Klopfenstein et al. |
| 5,762,408 | A | | 6/1998 | Marsh |
| 5,820,230 | A | | 10/1998 | Freeman |
| 6,019,443 | A | * | 2/2000 | Freeman ................. 305/100 |
| 6,045,201 | A | * | 4/2000 | Chappell et al. ........... 305/107 |
| 6,371,579 | B1 | * | 4/2002 | Phely .................... 305/115 |

* cited by examiner

Primary Examiner—S. Joseph Morano
Assistant Examiner—Jason R. Bellinger
(74) Attorney, Agent, or Firm—Jeff A Greene

(57) ABSTRACT

A debris stripping apparatus 64 is provided for an endless track laying work machine 10. The debris stripping apparatus 64 includes a wear bar 66 that protrudes from the outer circumferential surface 56 of the drive wheel 30. During operation the wear bar 66 acts as a sacrificial member that strips away mud and debris from the track roller assembly 12. Thus, the wear bar 66 creates a clearance allowing the drive wheel 30 to rotate without making abrading contact with the debris.

12 Claims, 3 Drawing Sheets

DEBRIS STRIPPING APPARATUS

TECHNICAL FIELD

The invention relates to endless track laying work machines and more particularly to a debris stripping apparatus.

BACKGROUND

Present day endless track laying work machines utilize a propulsion system with a track roller assembly positioned on each side of the work machine. Each track roller assembly utilizes an endless track, which is entrained about a drive wheel and an idler wheel. The drive wheel and idler wheel are mounted on a track roller frame and also includes a plurality of supporting mid-rollers. The motive force for some work machines is achieved by tensioning an endless rubber belt into frictional engagement with the drive wheel. Problems encountered in reducing endless track laying work machines utilizing endless rubber belts or tracks to practice include the build up of mud and debris on the roller frame and drive components.

A common problem when debris does build up is wear of the drive components. Wear is caused by the continuous contact and abrasive action generated between the endless rubber belts or tracks and other drive components, such as the drive wheel, the idler wheel, and the mid-rollers. The wear is more of a concern with endless track laying work machines that use endless rubber belts because the drive wheels, idler wheels and supporting mid-rollers are generally coated with an elastomeric material that does not wear as well as steel components.

A number of scrapper arrangements and debris eliminating devices have been designed since the introduction of track laying work machines utilizing endless rubber belts. An example of a prior solution is shown in U.S. Pat. No. 5,762,408 issued on Jun. 9, 1998 and assigned to Preston L. Marsh. In this example a pair of stripper arrangements are positioned adjacent to the edges of the endless rubber belt and one is positioned adjacent the inner surface of the endless rubber belt at the top of the track roller assembly. The patent does provide for removal of the debris from the endless rubber belt, but allows the debris to build up on the track roller frame.

The present invention is directed to overcome one or more of the problems as set forth above.

SUMMARY OF THE INVENTION

In one aspect of the present invention a debris stripping apparatus is provided for a track laying work machine. The debris stripping apparatus includes a drive wheel that has a first and a second wheel segment. A wear bar protrudes from an outer circumferential surface a predetermined distance "X".

The wear bar also laterally extends across a face of the outer circumferential surface of the first and the second wheel segments.

DETAILED DESCRIPTION

Figure 1:
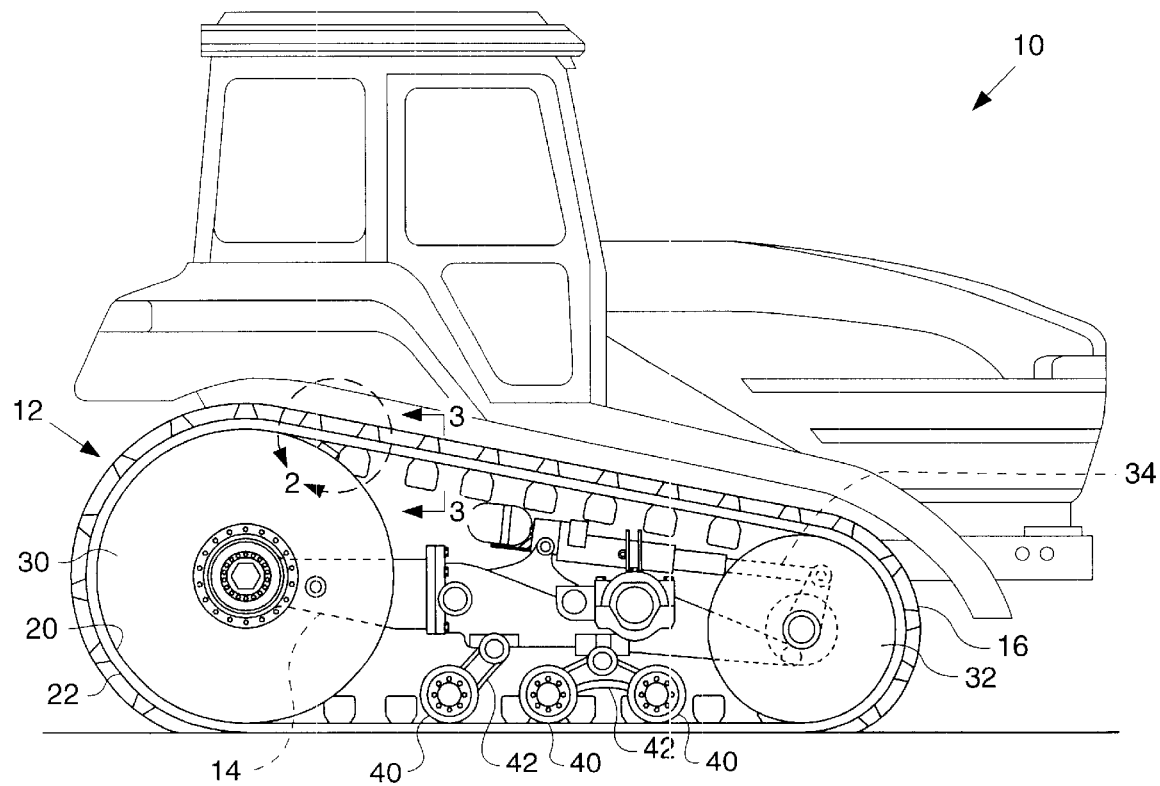
FIG. 1 is a side elevational view of a work machine embodying the present invention.

Referring to FIG. 1, an endless track laying work machine 10 is shown having a pair of track roller assemblies 12, only one shown, one positioned on each side of the endless track laying work machine 10. Each track roller assembly 12 includes a roller frame 14 and utilizes an endless rubber belt 16. The endless rubber belt 16 defines an inner surface 20, a ground contacting or outer surface 22, and a pair of edges 24. Positioned on the inner surface 20 and centrally located between the pair of edges 24 is a plurality of guide blocks 28. Each endless rubber belt 16 is entrained around a drive wheel 30 and an idler wheel 32. In as much as the track roller assemblies 12 are substantially structurally and operatively similar, further reference will be made to only a single side of the endless track laying work machine 10.

In this example, an engine (not shown) powers the drive wheel 30, in a conventional manner, and frictionally drives each of the endless rubber belts 16. Urging the idler wheel 32 away from the drive wheel 30, through the use of a tensioning system 34, tensions the endless rubber belt 16. The endless track laying work machine 10 is for example, an agricultural tractor positioning the drive wheel 30 near the back and the idler wheel 32 toward the front of the endless track laying work machine 10.

As further shown in FIG. 1 interposed the drive wheel 30 and the idler wheel 32 is a plurality of mid-rollers 40. The mid-rollers 40 are attached to a suspension member 42, such as a bogie frame or trailing arm that is attached to the roller frame 14. As an alternative, the mid-rollers 40 could be directly attached to the roller frame 14.

Figure 2:
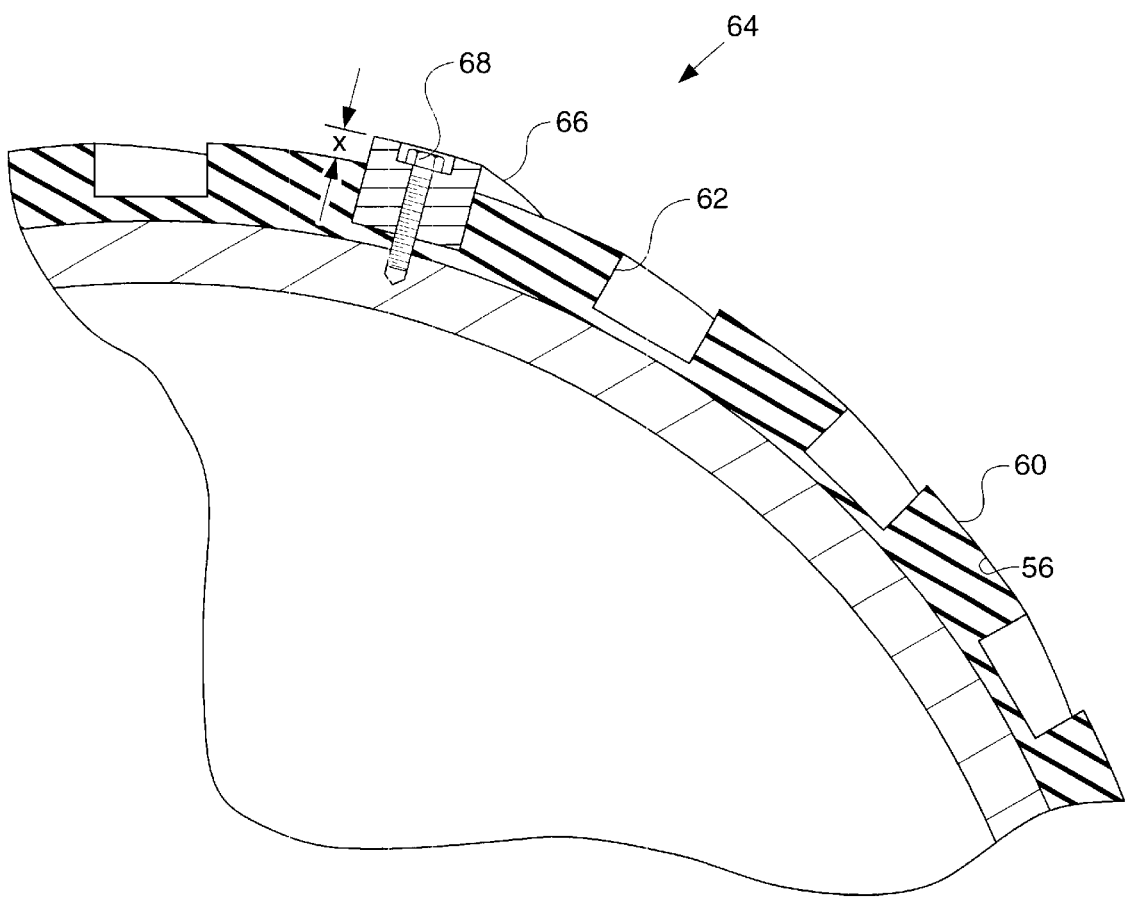
FIG. 2 is an enlarged cut away view of a drive wheel embodying the present invention taken from line 2—2 of FIG. 1.
Figure 3:
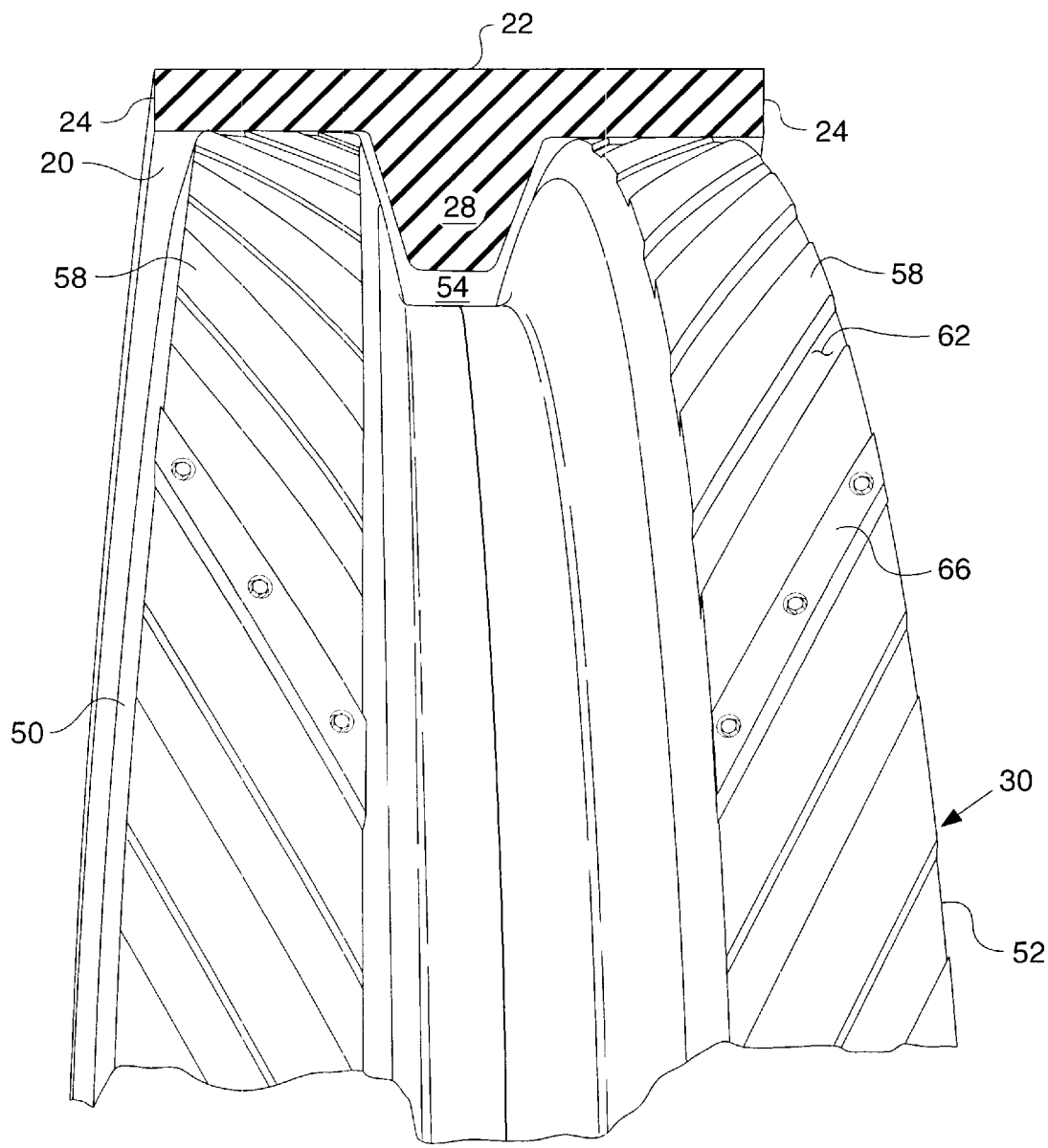
FIG. 3 is a sectional front view of the drive wheel embodying the present invention taken along line 3—3 of FIG. 1.

As shown in FIGS. 2 and 3, the drive wheel 30 is a segmented wheel that includes first and second spaced apart wheel segments 50,52. The first and second segments define a gap 54 for allowing the guide blocks 28 to travel there between during operation of the work machine 10. Each of the first and second wheel segments 50,52 includes an outer circumferential surface 56 and a laterally extending face portion 58. The outer circumferential surface 56 of each segment 50,52 has a coating of an elastomeric material 60 bonded thereto. It should be recognized that drive wheel 30 is not required to have the elastomeric material 60 and still be within the scope of the present invention. The elastomeric material 60 includes a plurality of laterally extending grooves 62 which may extend parallel to the axis of rotation of the drive wheel 30 and may extend at a predetermined angle as illustrated in FIG. 3. It should be recognized that drive wheel 30 does not require the laterally extending grooves 62 to be within the scope of the present invention.

As best seen in FIGS. 2 and 3 a debris stripping apparatus 64 is shown and will be described herein. The debris stripping apparatus 64 includes a wear bar 66 positioned within one of the laterally extending grooves 62 in each of the first and second wheel segments 50,52. As an alternative the debris stripping apparatus 64 may include a wear bar 66 positioned in a plurality of the laterally extending grooves 62. The wear bar is shown attached to the wheel segments 50,52 as by fastener 68. Wear bar 66 may be bonded to the drive wheel 30 within the elastomeric material 60 as well. Wear bar 66 extends radially beyond the outer circumferential surface 56 of the drive wheel 30 a predetermined distance "X". The distance that the wear bar extends beyond the outer circumferential surface 56 is in the range of 4.5 mm<X<6.5 mm. However, the predetermined distance "X" may be more or less depending on the specific design configuration of the track roller assembly 12.

Wear bar 66 is made of a harder material than the first and second wheel segments 50,52. This may be a material such as steel, ceramic, or any other abrasion resistant material.

Industrial Applicability

In operation debris has a tendency to build up on track roller assembly 12 components of the work machine 10. This is especially true when the work machine is operating in wet underfoot conditions. When the build up consists of mud or clay and is allowed to dry, the debris hardens to a consistency of cement. As the drive wheel 30 rotates against the hardened debris it abrades the outer circumferential surface 56 of the drive wheel 30.

The debris stripping apparatus 64 of the present invention provides a wear bar 66 that protrudes from the outer circumferential surface 56 of the drive wheel 30. As the drive wheel 30 rotates the wear bar 66, acts as a sacrificial member that cuts away the debris built up on the track roller assembly 12 every rotation of the drive wheel 30. Thus a cheap and effective debris stripping apparatus 64 is provided that prevents premature drive wheel 30 wear.

What is claimed is:

1. A debris stripping apparatus for a work machine comprising:
    a drive wheel having an outer circumferential surface being coated with an elastomeric material; and
    a wear bar protruding from an outer circumferential surface a predetermined distance "X" and laterally extending across a face portion of the outer circumferential surface of said drive wheel.

2. The debris stripping apparatus of claim 1, wherein the predetermined distance "X" that said wear bar protrudes from the outer circumferential surface of said drive wheel is in the range of 4.5 mm<X<6.5 mm.

3. The debris stripping apparatus of claim 1, wherein said drive wheel includes first and second wheel segments being spaced apart and defining a gap positioned therebetween.

4. The debris stripping apparatus of claim 3, including a wear bar protruding from the outer circumferential surface of each of said first and second wheel segments of said drive wheel.

5. The debris stripping apparatus of claim 4, including a plurality of wear bars each protruding from and laterally extending across the face portion of the outer circumferential surface of said first and second wheel segments of said drive wheel.

6. The debris stripping apparatus of claim 1, wherein the predetermined distance "X" that said wear bar protrudes from the outer circumferential surface of first and second wheel segments of said drive wheel is in the range of 4.5 mm<X<6.5 mm.

7. The debris stripping apparatus of claim 1, wherein said drive wheel includes first and second wheel segments.

8. The debris stripping apparatus of claim 7, wherein the wear bar is bonded to the elastomeric material coating.

9. The debris stripping apparatus of claim 1, wherein the wear bar is fastened to said drive wheel.

10. The debris stripping apparatus of claim 1, wherein the outer circumferential surface of said first and second wheel segments of said drive wheel includes a plurality of laterally extending grooves.

11. The debris stripping apparatus of claim 1, wherein the wear bar is made of metal.

12. An endless track laying work machine comprising:
    a pair of track roller assemblies positioned on each side of said work machine;
    said pair of track roller assemblies each includes an endless rubber belt entrained about a drive wheel and an idler wheel; and
    a debris stripping apparatus as set forth in claim 1.

* * * * *